United States Patent [19]

Piquin

[11] Patent Number: 4,534,082
[45] Date of Patent: Aug. 13, 1985

[54] DRAINAGE UNIT FOR AIRCRAFT SANITATION SYSTEMS

[75] Inventor: Jean-Claude Piquin, St. Herblain, France

[73] Assignee: Defontaine S.A., France

[21] Appl. No.: 425,680

[22] Filed: Sep. 28, 1982

[30] Foreign Application Priority Data

Mar. 16, 1982 [FR] France .................... 82 04419

[51] Int. Cl.³ ................................ A47L 7/00
[52] U.S. Cl. ............................ 15/315; 15/353
[58] Field of Search ........... 15/321, 322, 323, 353, 15/339, 419, 315

[56] References Cited

U.S. PATENT DOCUMENTS

| | | | |
|---|---|---|---|
| 2,711,554 | 6/1955 | Doyle | 15/419 |
| 3,089,177 | 5/1963 | Andersson-Sason | 15/323 |
| 3,378,025 | 4/1968 | Hilde, Jr. | 137/205 |
| 3,562,846 | 2/1971 | Creamer et al. | 15/353 |
| 3,956,776 | 5/1976 | Broek | 4/10 |
| 4,068,340 | 1/1978 | Forward | 15/339 X |
| 4,112,538 | 9/1978 | Bates | 15/353 X |
| 4,114,203 | 9/1978 | Carolan | 4/317 |
| 4,122,579 | 10/1978 | Parise | 15/353 |
| 4,226,000 | 10/1980 | Tribolet | 15/353 X |
| 4,234,980 | 11/1980 | DiVito et al. | 15/302 |
| 4,250,592 | 2/1981 | Emrick | 15/353 X |

FOREIGN PATENT DOCUMENTS

| | | |
|---|---|---|
| 2824662 | 1/1979 | Fed. Rep. of Germany . |
| 312647 | 7/1969 | Sweden .................. 15/419 |

Primary Examiner—Chris K. Moore
Attorney, Agent, or Firm—Kenyon & Kenyon

[57] ABSTRACT

The invention concerns a drainage unit in particular for aircraft sanitation systems.

The technical problem resides in providing such a unit which is extremely simple, reliable and effective.

According to the invention, this unit, which is formed by a mobile truck (1) carrying a collecting reservoir (12), comprises depression-producing means (18, 19) connected to the collecting reservoir (12) so as to produce the vacuum therein and take-off means (14) mounted in a support (15) and capable of being temporarily connected to the sanitation systems of the aircraft for transferring waste materials and waters to the reservoir (12), the depression-producing means (18, 19) for the reservoir, the take-off means (14) and the reservoir (12) being disposed on the chassis (4) of the truck (1) in the form of a compact assembly inscribed within the frame of the chassis (4).

The invention is principally employed for the rapid draining of aircraft sanitation systems.

16 Claims, 6 Drawing Figures

DRAINAGE UNIT FOR AIRCRAFT SANITATION SYSTEMS

The present invention relates to a drainage unit, in particular for an aircraft sanitation system, of the type comprising a mobile wheeled truck provided with a collecting reservoir for waste waters and materials and with clean water reserve and chemical product reserve tanks connected to a rinsing and chemical recharging pump for the sanitation system.

In the draining field, in particular for aircraft sanitation systems, there was used up to the present time an operational technique in which the sanitation system was drained merely by the effect of gravity. At the arrival of a flight, the aircraft was stopped on the parking area and a mobile wheeled vehicle took position under the aircraft in the region of a trap for opening the lower part of a collector connected via piping to the sanitation systems of the aircraft. This truck comprised a reservoir into which the sanitation systems were emptied under the action of the weight of the materials. Further, the truck comprised a water reserve tank and disinfecting and deodorising chemical product tanks, whose contents were conveyed to the sanitation systems by way of supply circuits.

This type of apparatus and this procedure was usually satisfactory.

However for some time, owing to the rapid turnover of aircraft and the high filling coefficients, it has been found that the draining operation often was not carried out in a satisfactory manner.

Indeed, a number of sanitation systems cannot be emptied because the pipes are obstructed by various objects, such as bottles, cigarette packets, and all kinds of foreign objects which become jammed in the elbows and prevent the normal draining of the corresponding sanitation system.

Consequently, if one does not succeed after some rapid attempts to clear the system, the aircraft must be brought to the hangars so as to take down the pipes and more usually the elbows in which the plugging material is collected so as to put the sanitation systems back into condition, it being understood that a new flight could not be undertaken without emptying the sanitation systems.

It is obvious that such a procedure is very expensive due to the immobilization of an aircraft and it is moreover highly unpleasant to the point where the personnel no longer want to carry it out.

A possible solution would be to employ pressure or depression (suction) so as to clear the obstructed pipes. But this solution must be rejected since the pipe elbows are of synthetic rubber and are too flexible to resist the pressure or the depression which could become severe in the event of resistance on the part of the plugging material. This would destroy the elbows and create leaks without even clearing the pipes.

This is why an object of the present invention is to solve these problems by providing a system for draining and recharging sanitation systems in a manner which is more effective, quicker and simpler than in the case of the technique of the prior art, with no risk of stopping up the pipes due to the presence of foreign bodies and with a genuine safety to the operability of the sanitation systems.

This problem is solved in a unit of the type described hereinbefore, owing to the fact that it comprises depression-producing means connected to the collecting reservoir for the purpose of creating a vacuum therein, and selective siphoning means for taking off fluid materials and/or materials in suspension to the exclusion of voluminous and/or heavy foreign bodies, the siphoning or taking off means connected to the collecting reservoir which is itself connected to depression-producing means; said depression-producing means, the taking off means and the collecting, water and chemical products reservoirs all being disposed on the chassis of the truck in the form of a compact assembly inscribed within the frame of the chassis.

Further, several variants of the construction are possible in accordance with the same technique.

According to a first version, it concerns a wheeled emptying apparatus intended for "emergency" operations and merely serving to empty rapidly the sanitation systems whose discharge pipes have been found to be obstructed in the course of an emptying operation employing gravity. It operates by gaining access thereto from inside the body of the aircraft and accessing tank or tanks which have remained full by way of the seat of their pan by introducing therein a portable siphon element. The obstructed pipes will not be cleared but the tank of the sanitation system(s) will be emptied and the aircraft will not be unexpectedly immobilized, because the clearing operation or operations will be carried out subsequently.

This constructional variant of the emergency type comprises portable take-off means comprising a flexible pipe connected to the upper part of the reservoir the support of which comprises a vertical circular cage rigid with the truck and located to one side of the reservoir and above the pump and motor assembly. Further, advantageously, the free end of the flexible pipe comprises a selective take-off siphon element for the waste materials and waters, the element to be introduced in the tank of the sanitation system to be emptied by way of the seat of the pan.

According to a second version, it concerns, on one hand, a self-propelling or pulled emptying apparatus of larger capacity including a rinsing and chemical recharging device, all of which is substituted for the presently-used means and is adapted for operational functions consisting of collecting waste materials and waters, supplying the rinsing waters and the recharging of chemical products, and, on the other hand, a fixed unit having the function of take-off means and constituted by the tank of the sanitation system which is modified so as to adapt it to the new technique of emptying by siphoning, the modification comprising a fixed siphon permanently disposed in said tank of the sanitation systems and connected to the existing pipes which are thus reused.

This other constructional variant of the operational type comprises, on one hand, fixed take-off means, constituted by a selective take-off siphon fixed in the tank of the sanitation systems and already existing pipes and, on the other hand, a flexible sleeve connecting the outlet of said reused pipes to the collecting reservoir of the emptying apparatus which reservoir is fixed to the truck in the vicinity of the reservoirs for the water and chemical products and the pumps and motors.

According to a third variant, applicable to either of the two previously-mentioned versions, it is possible to produce the depression by replacing both the vacuum pump and its electric motor by a heat engine which will take its air of combustion from the volume in which the depression is to be produced, an air inlet valve enabling a constant vacuum to be maintained while allowing the engine to be provided with the air required for its operation.

The use of a depression system obviously permits a more rational, rapid and reliable draining of the sanitation systems in question by means of a compact and mobile unit.

Further features and advantages of the invention will be apparent from the ensuing description with reference to the accompanying drawings in which.

Figure 1:
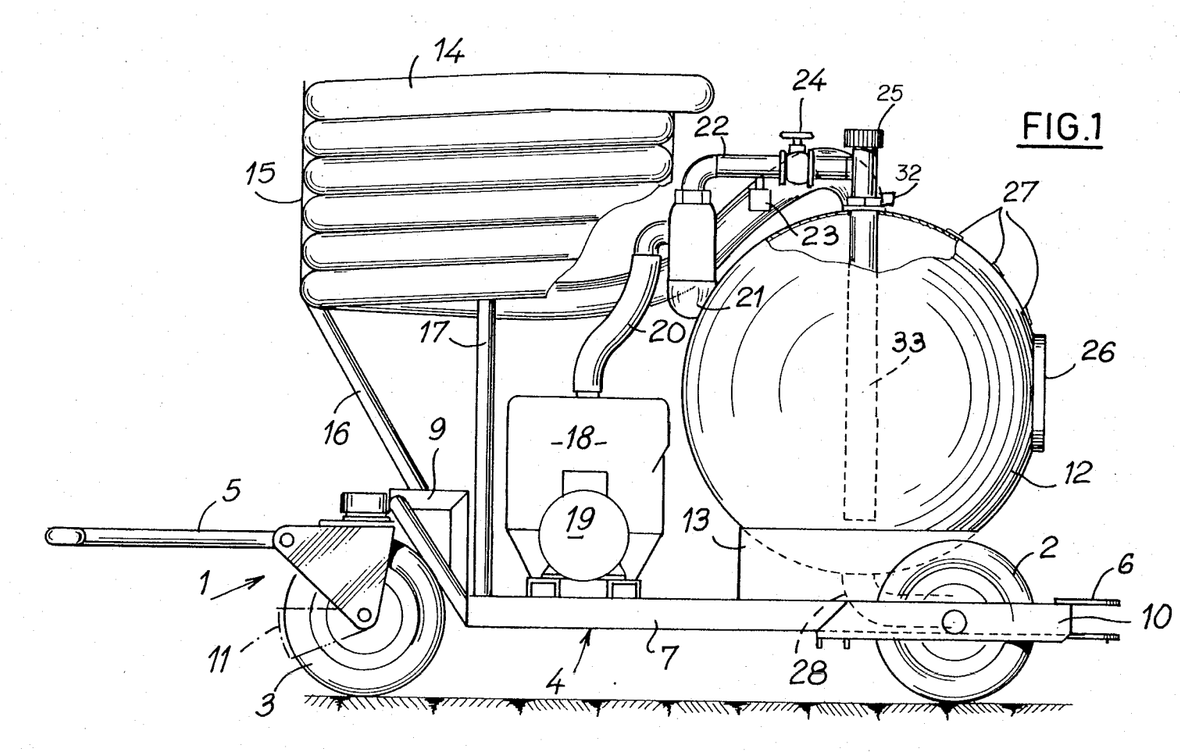
FIGS. 1 and 2 are respectively a side elevational view and a top view of a mobile unit for draining aircraft sanitation systems according to the invention.
Figure 2:
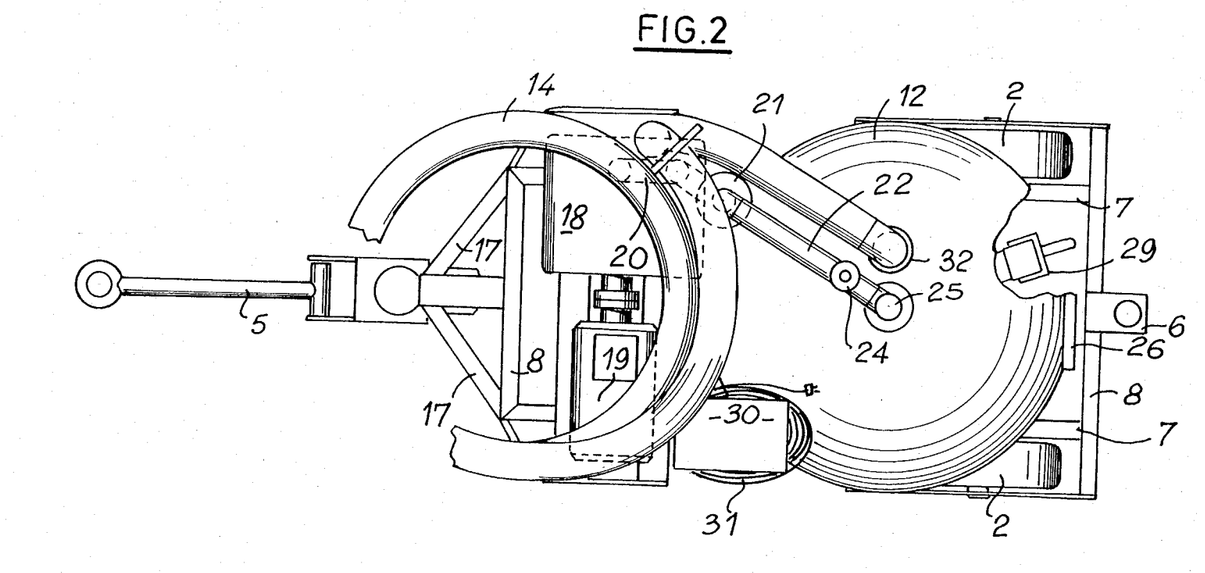

The embodiment illustrated in FIGS. 1 and 2 comprises a truck generally designated by the reference 1 and provided with non-steerable rear wheels 2 and a pivotable front wheel 3 carrying a horizontal chassis 4 the front of which comprises a tow-bar 5 and the rear of which is provided with a towing hook 6. The chassis 4 comprises two side-members 7, two cross-members 8, and a bracket 9 and a platform 10 supporting the axle of the wheels 2. Further, the axle of the wheel 3 carries a brake shoe 11.

The truck 1 supports a reservoir 12, for example of stainless steel, serving to collect the waste materials and waters and preferably having the shape of a spherical tank mounted on a sleeve 13 secured to the chassis, means 14 for taking off the materials and liquids of the sanitation systems (not shown) constituted in the form of a supported pipe which is wound into adjoining helical coils of constant diameter in a support 15 constituting a vertical protecting cage resting on the chassis 4 through legs such as 16 and 17, fixed to the outer periphery of the cage-forming support 15, and means for putting the inner space of the tank 12 under depression and constituted by a vacuum pump 18 and an electric motor 19.

According to a variant (not shown), these depression-producing means are solely constituted by a heat engine whose air intake is connected to the reservoir through a purifying trap provided with an air inlet valve acting as a means controlling the vacuum and the complementary air supply of the engine, the engine placed on the chassis of the truck between the reservoir and the support of the take-off means.

The tank 12, the pipe 14 placed in its support 15, the pump 18 and the motor 19 are disposed on the chassis 4 of the truck 1 in the form of a compact assembly inscribed within the frame of the chassis the pump 18 and the motor 19 being disposed above the support 15. The vacuum pump 18 is preferably a vane-type pump connected through a pipe 20 to a transparent purifying trap 21 which is connected to the tank 12 by means of a pipe 22 comprising in succession, in the direction of the tank, a vacustat 23 for controlling the vacuum created in the tank 12, an isolating valve 24 and overflow valve 25 located at the level of the connection of the pipe 22 to the upper part of the tank 12.

The tank 12 further comprises a manhole 26 placed horizontally, three sealed sights 27 and, in its lower part, a drainpipe 28 closed by a tap or plug 29.

Further, the motor 19 is connected to a control box 30 for starting up the motor and to which is connected an electric supply cable 31, for example 30 meters in length.

The flexible pipe 14 is connected through an elbow part to the upper part of the tank 12 by means of a connection with an unscrewable plug 32 for putting the pipe in communication with the open air, for the purpose of draining the tank 12, and is extended by a rectilinear flexible pipe element 33 down to the vicinity of the bottom of the tank.

Figure 3:
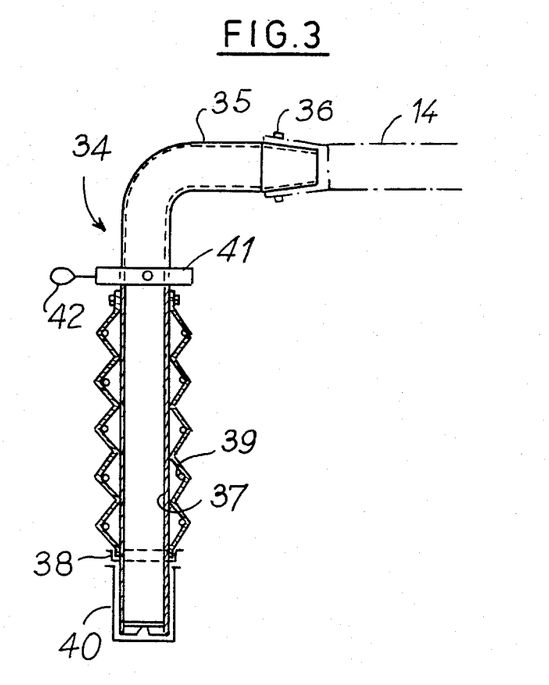
FIG. 3 is a view of the end part of the pipe for taking off and draining the sanitation systems of the unit of FIG. 1.

As shown in FIG. 3, the free end of the pipe 14 terminates in a siphon element 34 for removing waste material and water from a clogged tank. This element is constituted by a take-off tube whose end portion 35, which is bent at a right angle and to which the pipe 14 is fitted and fixed by a clamping collar 36 and whose free rectilinear portion 37 in the form of a tube carries a scraper 38 in the form of a ring sealing element sliding on the tube 37. The scraper 38 is connected to the sealing element by an outer elastic bellows 39 which surrounds the tube and whose end may be closed by a plug 40. Further, a vacuum inlet valve 41 employing a slide and lever 42 is mounted between the plug 40 and the bent portion 35.

There will be described below the mode of operation of the unit of FIGS. 1 to 3, as in the emergency situation, when plugging material obstructs the piping integrated in the aircraft.

The operator brings the unit in the immediate vicinity of the aircraft (not shown), the cable 31 is unwound and connected to a current socket. Then the operator starts up the vacuum pump by depressing a push-button (not shown) of the control box 30 so that the motor 19 driving the pump is started up.

While the pump creates a vacuum in the tank 12 and in all the piping 14 up to the valve 41, the operator unwinds the pipe, enters the aircraft and reaches the sanitation systems to be emptied (not shown). Meanwhile, when the vacuum is created, the motor has been stopped by the action of the vacustat 23.

When he reaches the pan of the sanitation system, the operator can then insert the take-off element 34 by way of the seat of the pan. He then opens the lever valve 41 and the liquid and materials contained in the sanitation system are then aspirated into the tank 12 by the vacuum prevailing in the pipe 14 and in the tank 12. The sanitation system can then be fully emptied.

In the course of the emptying operation, the pump 18 is started up again, by the regulation of the vacustat 23, whenever necessary to maintain the vacuum at a constant value (for example 646 mm Hg) and to ensure that the emptying is carried out in a regular and rapid manner.

Figures 4, 5, 6:
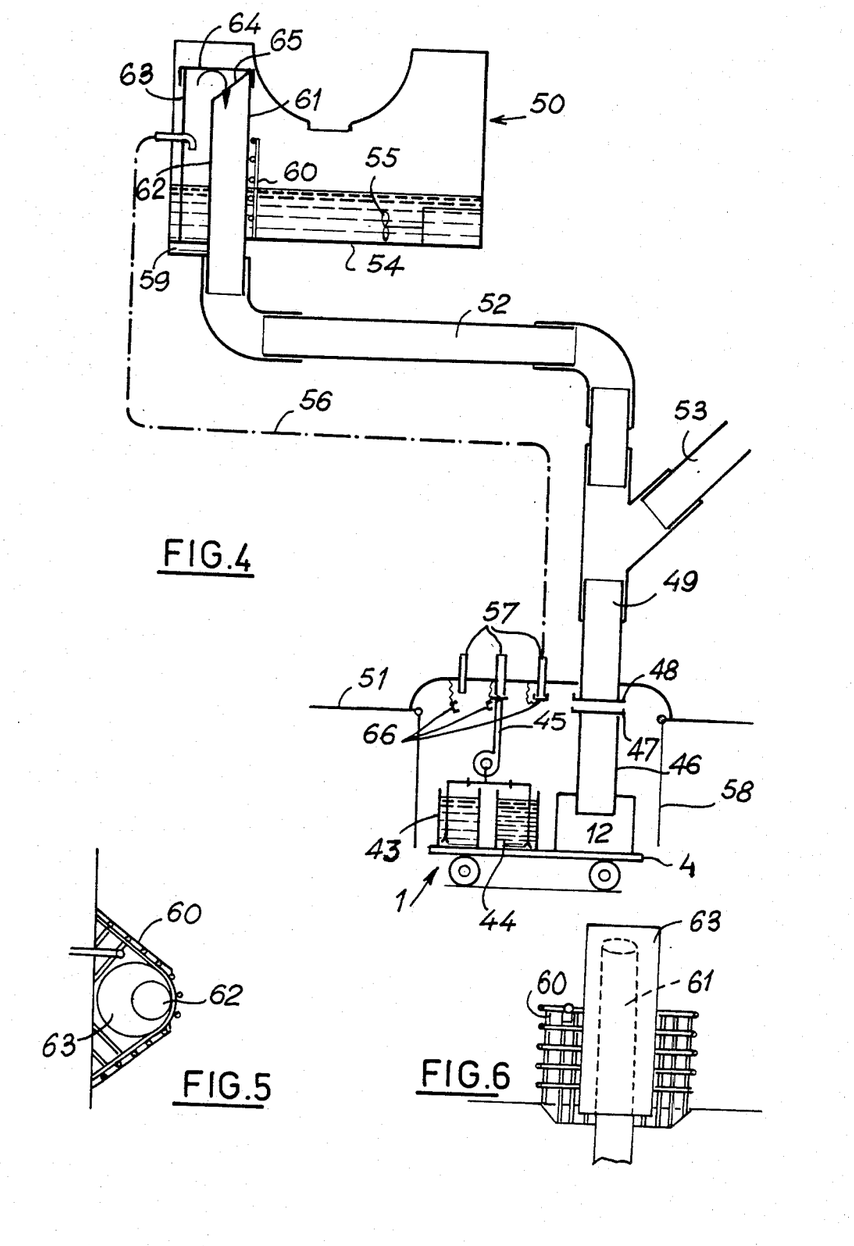
FIG. 4 is a diagrammatic assembly view of a variant of a unit according to the invention connected to an aircraft sanitation system.
FIGS. 5 and 6 are respectively a top view and an elevational view of a part of the tank of an aircraft sanitation system suitable for the use of the unit according to FIG. 4.

Hereinafter there will be described a variant of the construction of the invention with reference to FIGS. 4 to 6.

According to this variant, the mobile truck 1 is identical in construction to that of FIGS. 1 to 3. It moreover comprises a clean water tank 43, a tank 44 for chemical products and a pump 45 for withdrawing the liquid from these tanks by way of suitable pipes 57 (the elements 43 to 46 are not shown in FIGS. 1 to 3). The take-off means 14 which were previously fixedly connected directly to the tank 12 are here screwably connected thereto through a transparent flexible tubular sleeve 46. This sleeve comprises rapid coupling means diagrammatically represented at 47 and serving to couple it rapidly to a corresponding rapid coupling means 48 carried by the lower end of the header 49 frequently used in sanitation systems such as 50 installed in an aircraft 51 (coupling system known under the name of a "fireman's coupling"). Conduits 52, 53 are connected to the header 49 from various sanitation systems.

The sanitation systems such as 50 comprise a tank 54 in which an agitator 55 mixes the waste materials, waters, etc. and the water with the chemical products supplied by the pipes such as 56 from outlets 57 located on the side of the header 49 in a lower part of the fuselage of the aircraft 51 closed by a swingable door 58. The tank 54 has in its lower part (FIG. 4) a small draining tank 59 which permits completely emptying the useful volume of the tank 54.

Further, the tank 54 comprises a vertical protecting grille 60 (see also FIGS. 5 and 6) which precludes the passage of any foreign body toward the entrance of the siphon in the pipe 52.

Further, the pipe 52 terminates inside the tank 54 of the sanitation system in a take-off siphon element 61 formed by two tubes 62, 63 of light materials welded or adhered to each other in an eccentric manner along a generatrix, the inner tube 62 being longer than the outer tube 63 so as to allow the passage of the charged liquids. The upper end of the outer tube 63 includes a removable plug 64 and the upper part of the inner tube is beveled.

The disposition of the fixed take-off element 61 in the sanitation system 50 will always be on the axis of the latter, which is perpendicular to the axis of the aircraft, so as to avoid, when the aircraft becomes inclined, any overflow by way of this element.

There will now be described the manner of using this second embodiment of the invention termed "operational".

Upon the arrival of the flight, the aircraft is stopped on the parking area. The unit according to FIGS. 4 to 6 is brought under the aircraft 50, the transparent flexible sleeve 46 extending from the emptying reservoir 12 is connected to the aircraft.

The pump is started up in order to create the vacuum in the tank 12 and in the sleeve 46. In the meantime, and simultaneously, the pump starts to empty all the sanitation systems 50 connected to the same header 49.

The vacustat 23 operates the pump 18 when required so as to maintain the vacuum in the tank 12 and ensure a constant emptying rate.

This operation for emptying is consequently simpler than in the present state of the art in which the valve of each sanitation system must be opened.

In This case, each sanitation system remains connected to the header in a permanent manner.

When the emptying operation is finished, which is seen by the increase in vacustat pressure and by the observation of the transparent pipe, the rinsing operation is carried out. The precaution is taken to close the isolation valve 24 between the pump 18 and the receiving tank 12.

The operator then connects a water supply outlet hose to the water inlet 57 which leads to each sanitation system 50. Water will then be sent to each sanitation system in a sufficient amount.

In the course of this supply of water, or at the end thereof, depending on the chosen mode, the isolation valve 24 between the pump and the emptying tank will be reopened, the vacuum will resume its normal operation and will start the emptying of the rinsing waters into the emptying tank 12. As soon as the pressure rises in the vacustat, each sanitation system 50 will therefore be empty.

The isolation valve 24 between the pump 18 and the emptying tank 12 is closed before filling each sanitation system with water and chemical products. This operation is absolutely necessary, otherwise the chemical products will immediately return to the emptying tank.

Via the same liquid supply take-off in the pan, a suitable mixture of water and chemical products is sent so as to recharge each sanitation system with a sufficient quantity of mixture.

When this operation has been carried out, the emptying and recharging work has consequently finished. The various plugs 66 (FIG. 4) are then placed on the pipes of the aircraft after disconnection of the corresponding hoses.

After the rinsing operation, it is then possible, without unpleasantness, to inspect the bottom of each sanitation system 50 for the purpose of extracting the foreign bodies which were unable to pass through the fixed take-off element owing, on one hand, to the protection shown around this element, and on the other hand, to the shape of the swan-neck and, finally, to the weight of these foreign bodies.

Thus it will be seen that, by means of the unit according to the invention, the emptying and recharging operations are simplified as compared to the prior art and that, moreover, no stopping-up can occur in the pipes since the foreign bodies will always remain in the sanitation system. Further, to remove them after rinsing is a quite conventional and not unpleasant operation.

This device has consequently the advantage of simplification over the existing technique and moreover ensures a genuine safety to the operability of the sanitation systems in the operating state.

I claim:

1. Draining apparatus for an aircraft sanitation system, comprising:
    a mobile wheeled truck having mounted thereon a reservoir for collecting waste material and water, and vacuum-producing means connected to the reservoir for creating a vacuum therein; and
    selective take-off means including a siphon, the take-off means being connectable at one end to the reservoir and connectable at the other end to the aircraft sanitation system, so that when connected, the waste material and water are emptied into the reservoir mainly by siphon action, said take-off means having a rigid nozzle attached to the end thereof connectable to the aircraft sanitation system, and further comprising an elastic bellows concentrically mounted on the nozzle, the end of the bellows nearest the free end of the nozzle being slidably mounted on the nozzle and having means for scraping the surface of the nozzle coupled thereto, the end of the bellows farthest from the free end of the nozzle being fixedly attached to said nozzle.

2. Draining apparatus in accordance with claim 1, wherein the take-off means is portable.

3. Draining apparatus in accordance with claim 2, further comprising a vertical cylindrical support cage mounted on the truck, and wherein the take-off means comprises a flexible pipe storable at rest in the support cage.

4. Draining apparatus in accordance with claim 3, further comprising a vacuum inlet valve on the nozzle, so that the draw of the siphon may be turned on or off.

5. Draining apparatus in accordance with claim 2, further comprising a pipe disposed within the reservoir, adapted to communicate at one end with the take-off means when the take-off means is connected to the reservoir, and terminating at the other end in the vicinity of the bottom of the reservoir.

6. Draining apparatus in accordance with claim 2, wherein the end of the take-off means connectable to the reservoir is screwably connectable thereto.

7. Draining apparatus in accordance with claim 1, wherein the reservoir is spherical.

8. Draining apparatus in accordance with claim 7, wherein the reservoir comprises at least one sealed sight for viewing the contents therein.

9. Draining apparatus in accordance with claim 1, wherein the vacuum-producing means comprises a heat engine having an air intake for providing air for combustion connected to the reservoir.

10. Draining apparatus in accordance with claim 1, wherein the vacuum-producing means comprises a vane-type vacuum pump.

11. Draining apparatus in accordance with claim 1, wherein the vacuum-producing means comprises a vacuum pump driven by a motor.

12. Draining apparatus in accordance with claim 4, further comprising a purifying trap installed between the reservoir and the vacuum-producing means, for preventing solid material from reaching the vacuum-producing means.

13. Draining apparatus in accordance with claim 1, further comprising an air inlet valve installed between the reservoir and the vacuum-producing means, for controlling the evacuation of the reservoir.

14. Draining apparatus in accordance with claim 1, further comprising means for maintaining the vacuum level in the reservoir within a defined range.

15. Draining apparatus in accordance with claim 1, further comprising an overflow valve installed between the reservoir and the vacuum-producing means and adjacent to the reservoir, for preventing overflow of waste material and water from the reservoir to the vacuum-producing means.

16. Draining apparatus in accordance with claim 1, further comprising valve means installed between the reservoir and the vacuum-producing means for isolating the vacuum-producing means from the reservoir.

* * * * *

UNITED STATES PATENT AND TRADEMARK OFFICE
CERTIFICATE OF CORRECTION

PATENT NO. : 4,534,082

DATED : August 13, 1985

INVENTOR(S) : Jean-Claude Piquin

It is certified that error appears in the above-identified patent and that said Letters Patent is hereby corrected as shown below:

The ABSTRACT should read as follows:

--Disclosed is apparatus for draining aircraft sanitation systems comprising a mobile truck having thereon a reservoir for collecting the waste and take-off means including a siphon for carrying it from the aircraft to the reservoir. The reservoir is evacuated to aid the flow of the waste and the take-off means may be protected by a grille or other apparatus to prevent solid objects from entering the siphon and clogging it. The evacuation may be accomplished using a heat pump or other means which is connected to the reservoir through a purifying trap, an air inlet valve, an isolation valve, and/or a reservoir overflow valve. The take-off means may be separable from the aircraft sanitation system or integrated therein. In the integrated embodiment, the take-off means includes a tube which enters a holding tank in the sanitation system through the bottom of a small well depending from the bottom of the tank and terminates in a beveled open end. A capped outer tube surrounds this inner tube and is attached thereto in an eccentric manner. The outer tube is open only at the bottom and only at a level within the drainage well and below the main volume of the holding tank, so that substantially all the useable volume of the tank is emptied.--

UNITED STATES PATENT AND TRADEMARK OFFICE
CERTIFICATE OF CORRECTION

PATENT NO. : 4,534,082                    Page 2 of 2

DATED     : August 13, 1985

INVENTOR(S) : Jean-Claude Piquin

It is certified that error appears in the above-identified patent and that said Letters Patent is hereby corrected as shown below:

Col. 2, line 21, after "accessing" insert --the--.

Col. 6, line 41, after "systems" insert --.--, and delete "in the operating state".

Col. 8, line 7, delete "4" and insert --1--.

Signed and Sealed this

Nineteenth Day of August 1986

[SEAL]

Attest:

DONALD J. QUIGG

Attesting Officer       Commissioner of Patents and Trademarks